US008010978B2

(12) United States Patent
Park et al.

(10) Patent No.: US 8,010,978 B2
(45) Date of Patent: Aug. 30, 2011

(54) METHOD AND APPARATUS FOR PROVIDING PERSONALIZED ADVERTISEMENTS IN INTERNET PROTOCOL TV (IPTV) SYSTEM

(75) Inventors: Heuk Park, Daejeon-si (KR); Soon-seok Lee, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 543 days.

(21) Appl. No.: 12/137,947

(22) Filed: Jun. 12, 2008

(65) Prior Publication Data

US 2009/0150929 A1    Jun. 11, 2009

(30) Foreign Application Priority Data

Dec. 7, 2007   (KR) .................. 10-2007-0127156

(51) Int. Cl.
*H04N 7/025* (2006.01)

(52) U.S. Cl. ................ 725/34; 725/32; 725/33; 725/35; 725/36

(58) Field of Classification Search ............... 725/32–36
See application file for complete search history.

(56) References Cited

U.S. PATENT DOCUMENTS

| 7,814,521 B2* | 10/2010 | Ou et al. ......................... 725/96 |
| 2006/0075449 A1* | 4/2006 | Jagadeesan et al. .......... 725/113 |
| 2007/0143787 A1 | 6/2007 | Cankaya |
| 2007/0199036 A1 | 8/2007 | Coppens et al. |
| 2007/0283384 A1* | 12/2007 | Haeuser et al. ................. 725/34 |
| 2008/0040742 A1* | 2/2008 | Howcroft et al. .............. 725/34 |

(Continued)

FOREIGN PATENT DOCUMENTS

KR    2001-0034740    4/2001

(Continued)

OTHER PUBLICATIONS

Christian, Patrick et al., "Addressable IPTV Advertising: Dramatically Increasing Advertising Revenue per Viewer," *IP Television Magazine*, retrieved online at http://www.iptvarticles.com/iptvmagzine_2005_10_addressable_iptv_advertising.htm (2005).

*Primary Examiner* — Pankaj Kumar
*Assistant Examiner* — Mulugeta Mengesha
(74) *Attorney, Agent, or Firm* — Nelson Mullins Riley & Scarborough LLP; EuiHoon Lee, Esq.

(57) ABSTRACT

Provided are an apparatus and method for providing an advertisement service personalized for each user or for each group. The personalized advertisement providing method includes: a personalized advertisement providing method which is used in an Internet Protocol Television (IPTV) System, including: receiving at least one broadcasting program of a plurality of broadcasting programs classified according to a plurality of channels; and determining whether a present time is an advertisement broadcasting time, transmitting a received broadcasting program to a plurality of user terminals which selects a channel on which the broadcasting program is provided if the present time is not an advertisement broadcasting time, dividing the plurality of user terminals into a plurality of groups and transmitting an advertisement classified for each group to one or more user terminals belonging to the group if the present time is an advertisement broadcasting time. Therefore, it is possible to enhance use efficiency of bandwidths, to reduce restrictions related to installation, etc. of an apparatus for providing advertisement services, and to reduce the number of apparatuses that have to be installed, resulting in reduction of costs.

8 Claims, 4 Drawing Sheets

U.S. PATENT DOCUMENTS

| | | | |
|---|---|---|---|
| 2008/0066096 A1* | 3/2008 | Wollmershauser et al. | 725/32 |
| 2008/0114648 A1* | 5/2008 | Chen et al. | 705/14 |
| 2008/0181225 A1* | 7/2008 | Zampiello | 370/390 |
| 2008/0276267 A1* | 11/2008 | Badt et al. | 725/32 |
| 2008/0313669 A1* | 12/2008 | Acharya et al. | 725/34 |

FOREIGN PATENT DOCUMENTS

| | | | |
|---|---|---|---|
| KR | 1020070035328 | | 3/2007 |
| WO | WO-99/52285 A1 | | 10/1999 |
| WO | WO 2006064224 | * | 6/2006 |

* cited by examiner

METHOD AND APPARATUS FOR PROVIDING PERSONALIZED ADVERTISEMENTS IN INTERNET PROTOCOL TV (IPTV) SYSTEM

CROSS REFERENCE TO RELATED APPLICATIONS

This application claims priority from Korean Patent Application No. 10-2007-0127156, filed on Dec. 7, 2007, the disclosure of which is incorporated herein in its entirety by reference.

BACKGROUND OF THE INVENTION

1. Field of the Invention

The present invention relates to an Internet Protocol Television (IPTV), and more particularly, to an apparatus and method for providing an advertising service personalized for each user or for each group in an Internet Protocol TV (IPTV).

This work was supported by the IT R&D program of Ministry of Information and Communication (MIC)/Institute for Information Technology Advancement (IITA) [2006-S-064-02, BcN Network Engineering].

2. Description of the Related Art

An Internet Protocol Television (IPTV) is a communication/broadcasting integrated service which provides interactive data services while providing a digital channel broadcast as a basic service, through a broadband convergence network (BcN).

Most real-time broadcasting services including existing terrestrial broadcasting have had advertisement profit as a source of profit. However, since terrestrial broadcasting transmits a program to all subscribers who are located in a predetermined region and the subscribers watch the program passively, there is no other way but to transmit the same advertisements to all the subscribers even though the advertisements can be changed for each program or for each region.

For example, a conventional real-time advertisement providing method based on a multi-cast inserts an advertisement into a broadcasting program channel, and then transmits broadcasting streams including the advertisement in a multicast manner to all subscribers that have selected the broadcasting program channel, regardless of subscriber preferences. However, since the conventional method does not reflect subscriber preferences in broadcasting, the conventional method is suitable for centralized advertising or local advertising, and is similar to advertising used in an existing cable broadcast.

Meanwhile, even if an existing real-time broadcasting service is provided through an IPTV, advertisement profit will still be a major source of profit. In particular, since consumer preferences can be measured in various ways due to interactivity, which is an important characteristic of the IPTV, target marketing of advertising services is possible.

In an IPTV service which can distinguish users based on authentication, since an advertisement provider can easily obtain information about user preferences, the advertisement provider can provide advertisements personalized according to the user preferences on the basis of the information about the user preferences. However, since real-time broadcasting of IPTV uses a multicast method to transfer content to a plurality of subscribers, the content has to be transformed using a unicast method in order to provide advertisements personalized according to an existing method.

That is, a conventional real-time advertisement providing method inserts advertisements personalized according to user preferences into a program which is transmitted by a multicast method, and creates and transmits the program as independent unicast streams. The user preferences can be classified into classes, such as income, age, family configuration, taste.

However, since the conventional method requires installation of an advertisement server near a digital subscriber line access multiplexer (DSLAM), a large number of advertisement servers have to be installed, and thus costs for installation and management increase.

Also, although an advertisement server is installed on or over a concentration switch in order to reduce the number of advertisement servers, due to the characteristics of real-time broadcasting in which a plurality of subscribers watch the same program provided on a channel a plurality of broadcasting streams having the same format have to occupy a link, which causes unnecessary waste of resources.

SUMMARY OF THE INVENTION

The present invention provides a method and apparatus for providing an advertisement personalized using a multicast method.

According to an aspect of the present invention, there is provided a personalized advertisement providing method which is used in an Internet Protocol Television (IPTV) System, including: receiving at least one broadcasting program of a plurality of broadcasting programs classified according to a plurality of channels; and determining whether a present time is an advertisement broadcasting time, transmitting a received broadcasting program to a plurality of user terminals which selects a channel on which the broadcasting program is provided if the present time is not an advertisement broadcasting time, dividing the plurality of user terminals into a plurality of groups and transmitting an advertisement classified for each group to one or more user terminals belonging to the group if the present time is an advertisement broadcasting time.

The transmitting of the advertisement to the one or more user terminals is performed using a multicast method, and the classifying of the plurality of user terminals to the plurality of groups is performed using a plurality of source addresses of multicast packets.

The advertisement is provided according to a source address for each available advertisement insertion period in a channel.

According to another aspect of the present invention, there is provided a personalized advertisement providing apparatus which is used in an Internet Protocol Television (IPTV) system, including: a data receiver receiving a plurality of advertisements classified respectively for a plurality of groups; an advertisement inserting unit receiving at least one broadcasting program from among a plurality of broadcasting programs divided according to a plurality of channels, dividing a plurality of user terminals into a plurality of groups, and inserting an advertisement classified for each group into the at least one broadcasting program; and a transmitting unit determining whether a present time is an advertisement broadcasting time, transmitting the at least one received broadcasting program to one or more user terminals which select a channel on which the at least one broadcasting program is provided if the present time is not an advertisement broadcasting time, and transmitting to the one or more user terminals a broadcasting program into which an advertisement for each group is inserted if the present time is an advertisement broadcasting time.

Therefore, according to the present invention, by identifying targets through sources in an advertisement available region where advertisements can be provided while using a multicast method, it is possible to enhance use efficiency of bandwidths, to reduce restrictions related to installation, etc. of an advertisement service providing apparatus, and to reduce the number of apparatuses that have to be installed, resulting in reduction of costs.

Also, the personalized advertisement providing method according to the present invention can be used without greatly changing the conventional multicast-type realtime broadcasting program providing method.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the aspects of the invention.

DETAILED DESCRIPTION OF EXEMPLARY EMBODIMENTS

Figure 1:
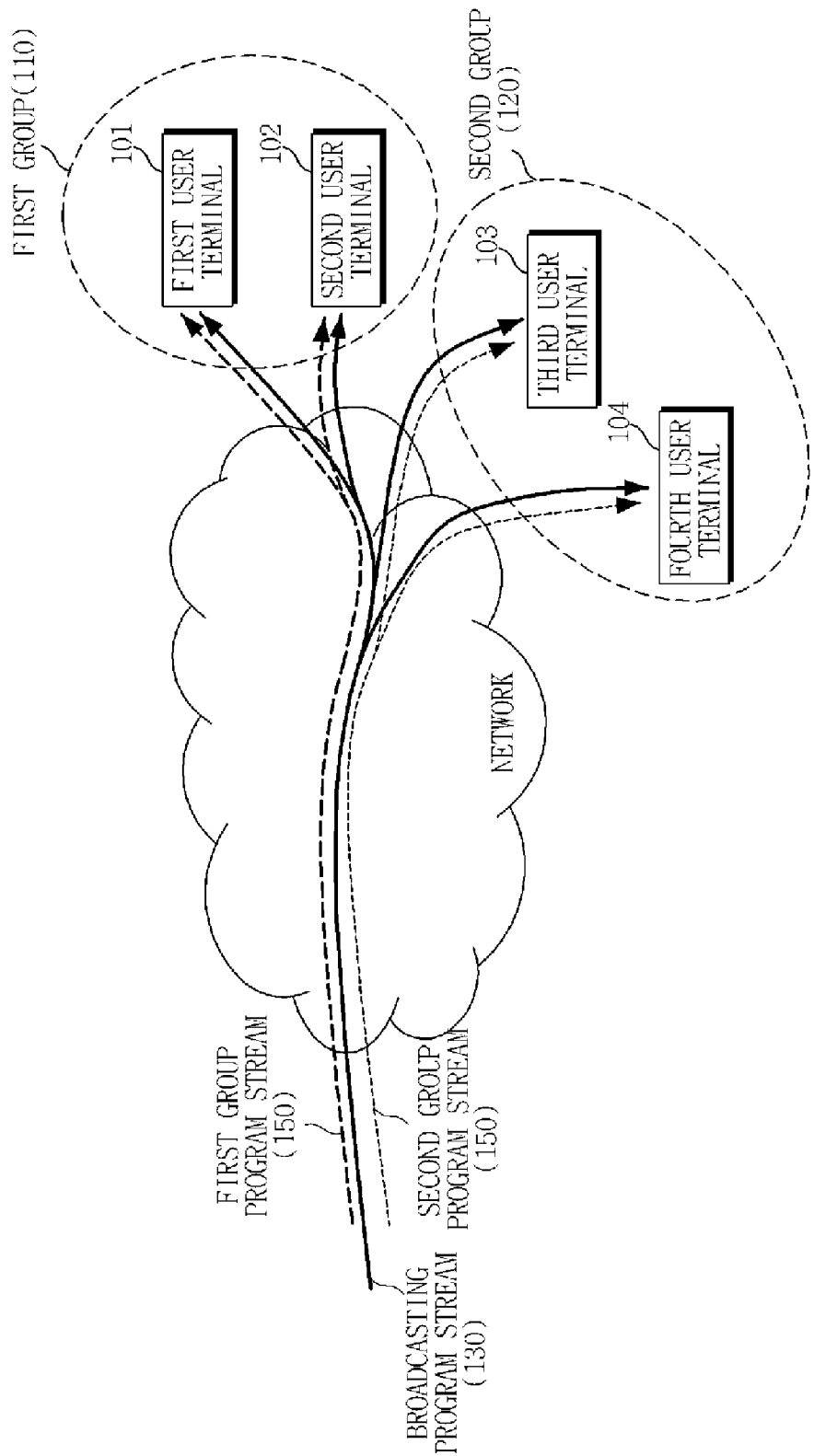
FIG. 1 is a view for explaining a method of dividing a multicast tree into a plurality of trees that are grouped into several groups so that different advertisement services are provided to the respective groups, according to an embodiment of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Personalizing and grouping of advertisements is done to provide an advertisement for each target group in connection with a program which is currently being provided. A provider which provides an Internet Protocol Television (IPTV) service can classify user profiles using user registration information, user preferences for programs, information about services used by users, etc. Since producing advertisements for each user is not efficient in view of manufacturing costs or system management, advertisers tend to produce advertisements for each specific group.

Accordingly, when a provider provides a program, it is efficient for the provider to identify each group and provide advertisements personalized for each group according to the program.

FIG. 1 is a view for explaining a method of dividing a multicast tree into a plurality of trees that are grouped into several groups so that different advertisement services are provided to the respective groups, according to an embodiment of the present invention.

If a first group 110 includes user terminals 101 and 102 and a second group 120 includes user terminals 103 and 104, the first group 110 and the second group 120 form different advertisement groups. A broadcasting program stream 130 is provided to all user terminals 101, 102, 103, and 104. When an advertisement is broadcasted, a first group program stream 140 is provided to the user terminals 101 and 102 of the first group 110, and a second group program stream 150 is provided to the user terminals 103 and 104 of the second group 120. Thus, a personalized, grouped advertisement service can be provided in a multicast manner.

Figure 2:
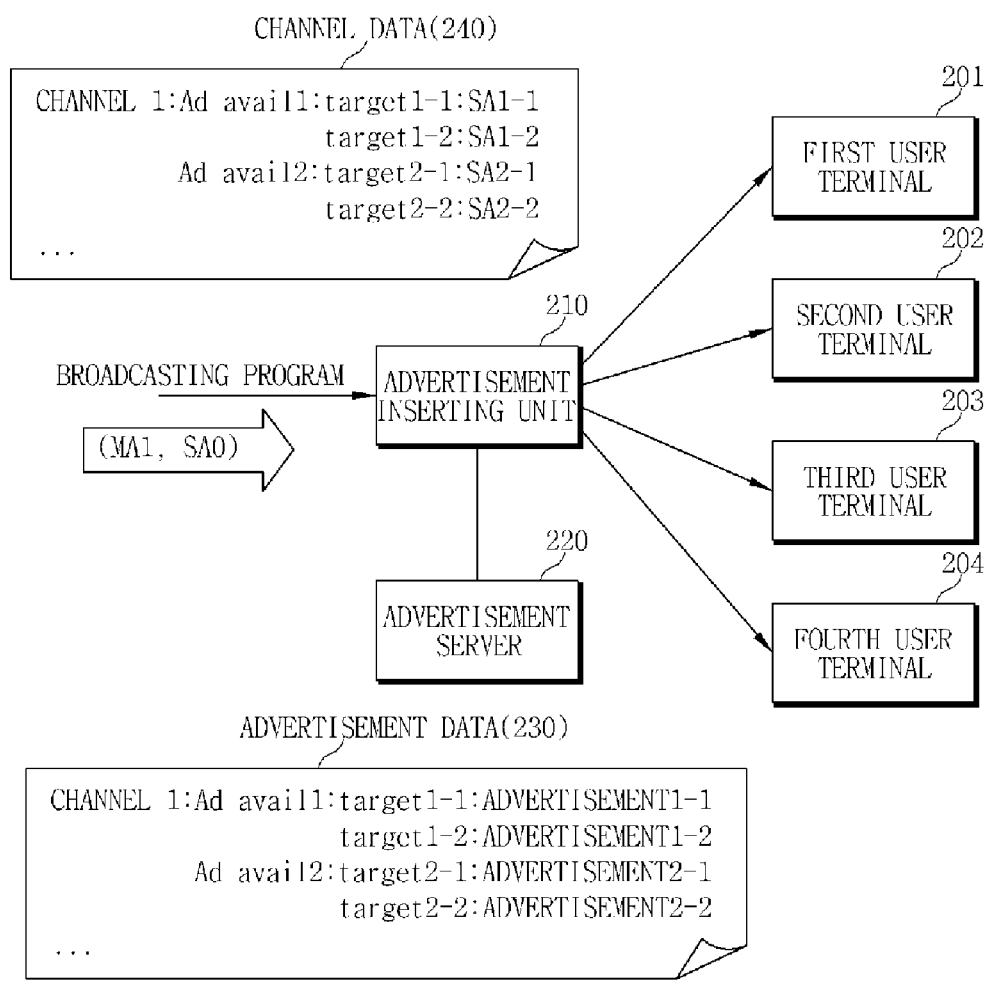
FIG. 2 is a view for explaining a method of providing an advertisement service for each group using a source address of a multicast packet, according to an embodiment of the present invention.

FIG. 2 is a view for explaining a method of providing an advertisement service for each group using a source address of a multicast packet, according to an embodiment of the present invention.

In FIG. 2, each broadcasting channel is identified by a multicast address (MA). For example, a channel KBS1 is identified by MA1, a channel KBS2 is identified by MA2, a channel MBC is identified by MA3, and a channel SBS is identified by MA4. Also, a source address (SA) represents a target group to which the corresponding advertisement will be provided on a channel. For example, a source address SA1 indicates a first user terminal 201 and a second user terminal 202, and a source address SA2 indicates a third user terminal 203 and a fourth user terminal 204.

For example, if any target group exists in a region which the advertisement inserting unit 210 manages, when a current broadcasting program is transmitted using a multicast address MA1 and a source address SA0, an advertisement server 220 manages an advertisement data list 230 for target groups for each available advertisement insertion period of a channel on which the broadcasting program is provided, and transfers an advertisement for the target group to the advertisement inserting unit 210 in the available advertisement insertion period with reference to the advertisement data list 230.

The advertisement inserting unit 210 inserts advertisements classified for respective target groups into a program that is to be transmitted to the target groups, in each available advertisement insertion period, with reference to channel data 240 which designates a source address SA indicating a target group for each available advertisement insertion period, and broadcasts the resultant program using the source address SA.

Meanwhile, SA1-1 and SA1-2 represent different advertisements that are to be transmitted to a target group. For example, SA1 is a user group with interests in cars, SA1-1 is an advertisement for a car "Grandeur", and SA1-2 is an advertisement for a car "Sonata".

Figure 3:
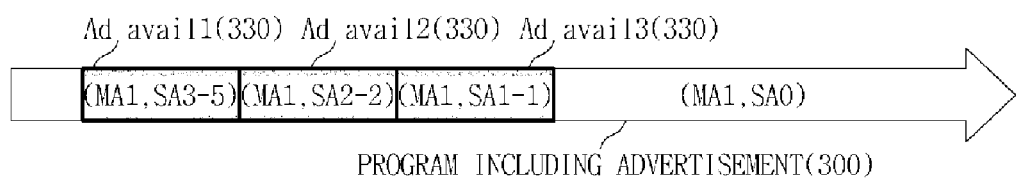
FIG. 3 illustrates an example of a program including an advertisement.

FIG. 3 illustrates an example of a program including advertisements.

Referring to FIG. 3, advertisement content 5 corresponding to a target group address SA3 is inserted in a first available advertisement insertion period 310, advertisement content 2 corresponding to a target group address SA2 is inserted in a second available advertisement insertion period 320, and advertisement content 1 corresponding to a target group address SA1 is inserted in a third available advertisement inserting period 330.

That is, by receiving a program including advertisements of source addresses SA corresponding to respective target groups, it is possible to receive different advertisements for the respective target groups.

Figure 4:
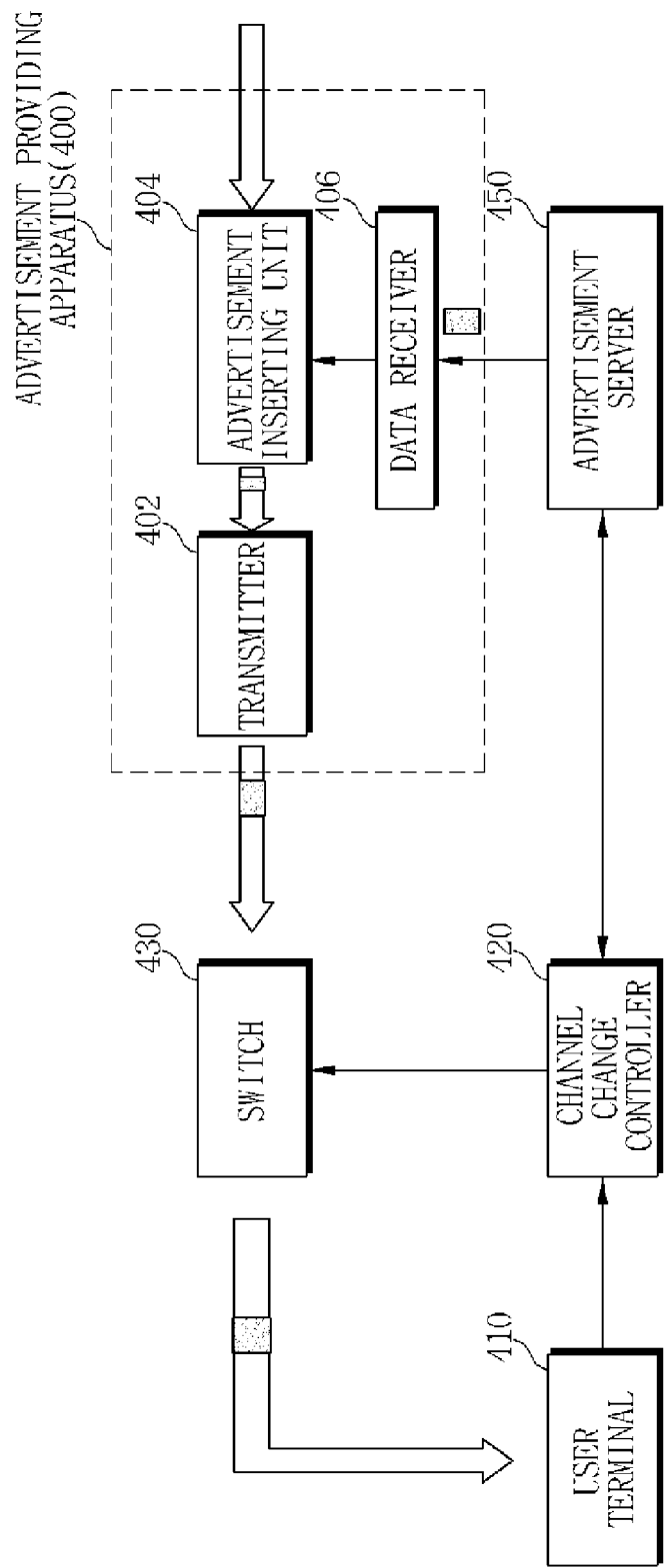
FIG. 4 shows a network architecture for transmitting advertisements classified according to source addresses to respective groups, and an advertisement providing apparatus 400 according to an embodiment of the present invention.

FIG. 4 shows a network architecture for transmitting advertisements classified according to source addresses to respective groups, and an advertisement providing apparatus 400 according to an embodiment of the present invention.

The advertisement providing apparatus 400 includes a transmitter 402, an advertisement inserting unit 404, and a data receiver 406.

If a specific subscriber terminal 410 transmits a channel change request to a channel conversion controller 420, the channel change controller 420 transmits to an advertisement server 450 information regarding a channel selected by the corresponding subscriber. The advertisement server 450 determines whether any subscriber in a specific group currently watches the channel selected by the subscriber, on the basis of the information regarding the selected channel. The advertisement providing apparatus 400 inserts the advertisement received from the advertisement server 450 into a broadcasting program with reference to the information regarding the selected channel.

In more detail, the data receiver 406 receives an advertisement from the advertisement server 450. Then, the advertisement inserting unit 404 inserts the advertisement into a broadcasting program received separately for each channel. Details for inserting of advertisements have been described above with reference to FIG. 3. The transmitter 402 determines whether a present time is an advertisement broadcasting time, transmits the received broadcasting program to subscriber terminals selecting a channel on which the broadcasting program is provided if the present time is not an advertisement broadcasting time, and transmits to the subscriber terminals a broadcasting program into which the advertisement has been inserted if the present time is an advertisement broadcasting time.

The channel change controller 420 receives an address of a target group to which the subscriber belongs from the advertisement server 450 or from another entity which manages subscriber information. If the data structure of target groups is simple, in some cases, the channel change controller 420 may manage an address of a target group. On the basis of the received address information for the target group, the channel change controller 420 instructs a switch 430 to add a port to which the subscriber is connected to the target group of (MA, SA).

The switch 430 transfers the broadcasting program including the advertisement to the target group using information received from the channel change controller 420. The channel change controller 420 can be included in the switch 430. When an Internet Group Management Protocol (IGMP) is used as a protocol for channel change, the channel change controller 420 and the switch 430 can use IGMPv3 to identify a source address. If the subscriber terminal 410 uses IGMPv2, the channel change controller 420 checks a source address of a desired target group, using a JOIN message of the subscriber, and then communicates with the switch 430 using the IGMPv3.

Meanwhile, if a network consisting of routers exists in an upstream interface of the switch 430, the network can identify a source address by using a multicast routing protocol such as a Protocol Independent Multicast-Sparse Mode (PIM-SM) which can identify a source address. Also, the network can establish and utilize a virtual LAN (VLAN) to identify source addresses.

Figure 5:
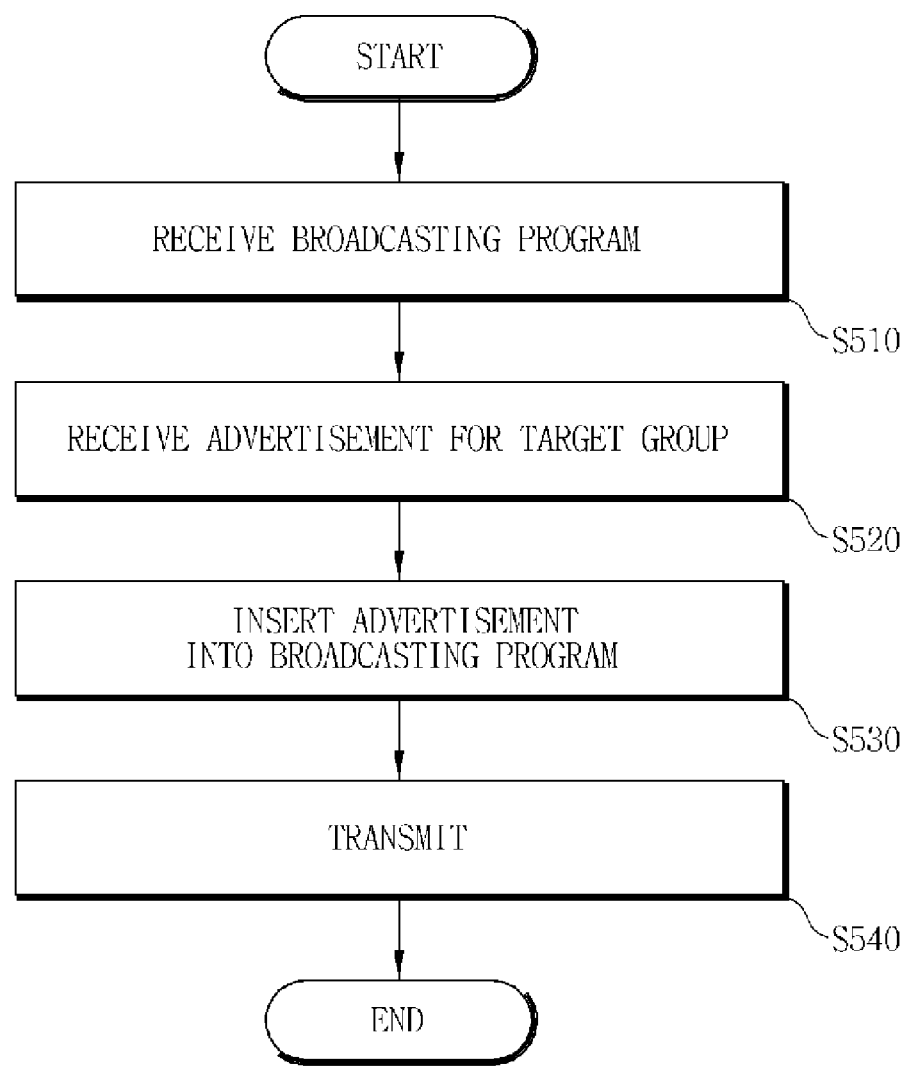
FIG. 5 is a flowchart of a personalized advertisement providing method according to an embodiment of the present invention.

FIG. 5 is a flowchart of a personalized advertisement providing method according to an embodiment of the present invention.

First, a broadcasting program is received (operation S510). That is, a broadcasting program for each channel is received. Then, an advertisement for each target group is received from an advertisement server (operation S520), and inserted into a broadcasting program in an available advertisement insertion period with reference to channel data (operation S530). Then, the broadcasting program is transmitted to each user terminal (operation S540). That is, it is determined whether a present time is an advertisement broadcasting time, the broadcasting program is transmitted to user terminals which selects a channel on which the broadcasting program is provided if the present time is not an advertisement broadcasting time, and if the present time is an advertisement broadcasting time, an advertisement classified for each group is transmitted to user terminals belonging to the group.

In more detail, if a channel change request is received from a user terminal, information about a group in which a subscriber of the user terminal is included is acquired in response to the channel change request. Then, a port to which the subscriber is connected is added to a transmission multicast with reference to the information about the group, so that an advertisement for the subscriber group is transmitted.

Transmission of an advertisement to a user terminal is performed by a multicast method, and classifying user terminals into groups is performed using multicast addresses (MA). Also, advertisements are classified using source addresses (SA) for each available advertisement insertion period in a channel.

Detailed processes have been explained above with reference to FIGS. 2, 3, and 4.

Meanwhile, the personalized advertisement service providing method as described above can be written by a computer program. Codes and code segments encompassing the program can be easily inferred by a skilled computer programmer in the art. Also, the program can be stored in a computer-readable recording medium, and read and executed by a computer, thereby implementing the personalized advertisement service providing method. The information storage medium includes a magnetic recording medium, an optical recording medium, and a carrier waver medium. The present invention can be utilized in a system which provides custom-made advertisements personalized for each user or for each group in an IPTV.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A personalized advertisement providing method which is used in an Internet Protocol Television (IPTV) System, comprising:

receiving at least one broadcasting program of a plurality of broadcasting programs classified according to a plurality of channels; and determining whether a present time is an advertisement broadcasting time, transmitting a received broadcasting program to a plurality of user terminals which selects a channel on which the broadcasting program is provided if the present time is not an advertisement broadcasting time, dividing the plurality of user terminals into a plurality of groups and transmitting an advertisement classified for each group to one or more user terminals belonging to the group if the present time is an advertisement broadcasting time, wherein the transmitting of the advertisement comprises:

receiving a channel change request from a user terminal;

acquiring information about a group to which a subscriber of the user terminal belongs, in response to the channel change request; and instructing a network switch to add a port to which the subscriber is connected to a multicast tree which transmits to the user terminal an advertisement for the group to which the subscriber of the user terminal belongs, with reference to the information about the group to which the subscriber of the user terminal belongs.

2. The personalized advertisement providing method of claim 1, wherein the transmitting of the advertisement to the one or more user terminals is performed using a multicast method, and the classifying of the plurality of user terminals to the plurality of groups is performed using a plurality of source addresses of multicast packets.

3. The personalized advertisement providing method of claim 1, wherein the advertisement is provided according to a source address for each available advertisement insertion period in a channel.

4. A personalized advertisement providing apparatus which is used in an Internet Protocol Television (IPTV) system, comprising:

a data receiver receiving a plurality of advertisements classified respectively for a plurality of groups;

an advertisement inserting unit receiving at least one broadcasting program from among a plurality of broadcasting programs divided according to a plurality of channels, dividing a plurality of user terminals into a plurality of groups, and inserting an advertisement classified for each group into the at least one broadcasting program; and a transmitting unit determining whether a present time is an advertisement broadcasting time, transmitting the at least one received broadcasting program to one or more user terminals which select a channel on which the at least one broadcasting program is provided if the present time is not an advertisement broadcasting time, and transmitting to the one or more user terminals a broadcasting program into which an advertisement for each group is inserted if the present time is an advertisement broadcasting time, wherein the transmitting unit receives a channel change request from the user terminal, acquires information about a group to which a subscriber of the user terminal belongs, in response to the channel change request, and instructs a network switch to add a port to which the subscriber of the user terminal is connected to a multicast tree which transmits an advertisement about the group to which the subscriber of the user terminal belongs, with reference to the information about the group.

5. The personalized advertisement providing apparatus of claim 4, wherein the transmitting of the at least one received broadcasting program or the broadcasting program into which the advertisement for each group is inserted is performed by a multicast method, and the dividing of the plurality of user terminals into the plurality of groups is performed using source addresses of multicast packets.

6. The personalized advertisement providing apparatus of claim 4, further comprising providing an advertisement classified according to a source address for each available advertisement insertion period in the channel.

7. The personalized advertisement providing apparatus of claim 4, wherein the plurality of advertisements are classified for the plurality of groups on the basis of a profile including user registration information, user preferences for programs, and information about services used by users.

8. The personalized advertisement providing apparatus of claim 4, wherein the data receiver receives the plurality of advertisements classified respectively for the plurality of groups, from an advertisement server, for each available advertisement insertion period in the channel.

* * * * *